Jan. 16, 1923.
F. X. SCHERRMAN.
END GATE OR TAILBOARD FOR WAGONS.
FILED APR. 10, 1922.
1,442,542
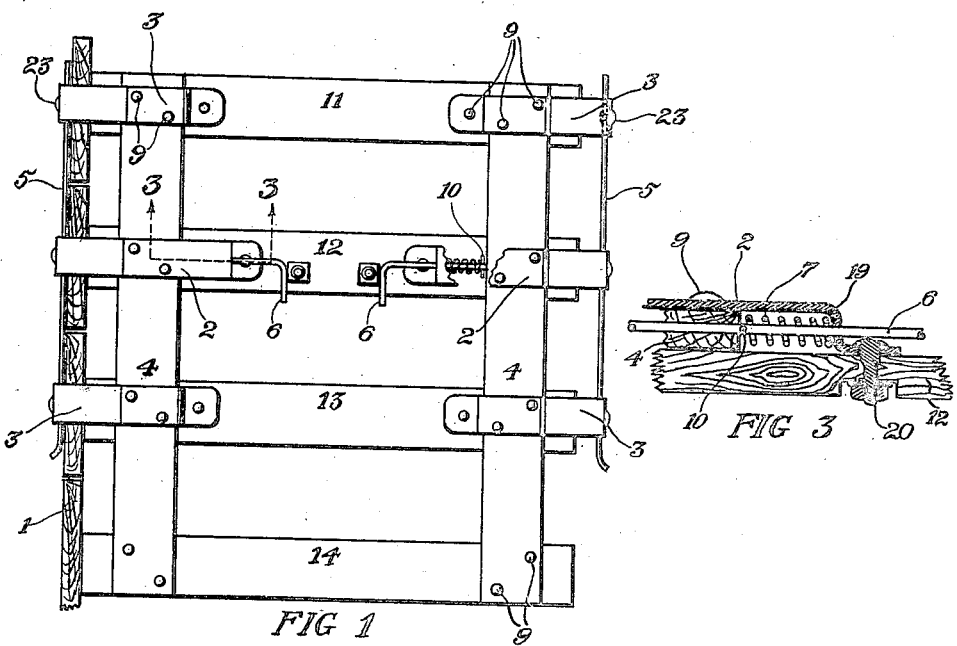
FIG 1
FIG 3
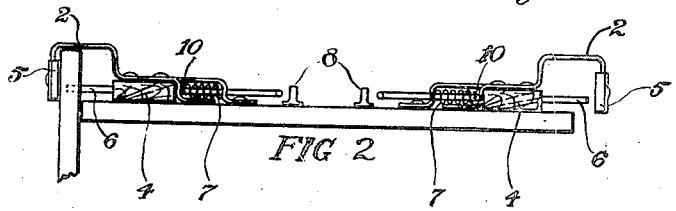
FIG 2
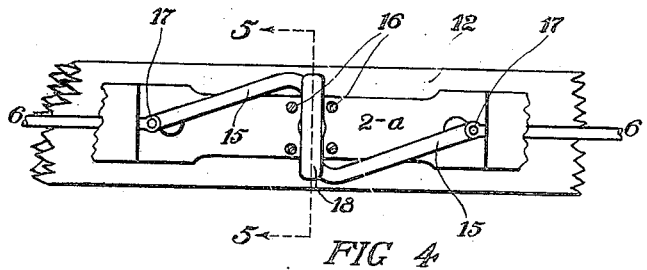
FIG 4
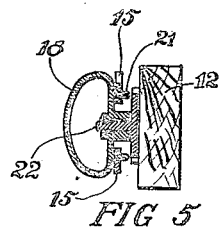
FIG 5
INVENTOR
Frank X. Scherrman
John C. Kramer
ATTORNEY
Witnesses.
E. F. L. Smith
V. A. Johnson Patented Jan. 16, 1923.

1,442,542

UNITED STATES PATENT OFFICE.

FRANK X. SCHERRMAN, OF FARLEY, IOWA.

END GATE OR TAILBOARD FOR WAGONS.

Application filed April 10, 1922. Serial No. 551,277.

*To all whom it may concern:*

Be it known that I, FRANK X. SCHERR-MAN, a citizen of the United States, residing at Farley, in the county of Dubuque and State of Iowa, have invented certain new and useful Improvements in End Gates or Tailboards for Wagons; and I do hereby declare the following to be a full, clear, and exact description of the invention, such as will enable others skilled in the art to which it appertains to make and use the same.

This invention is directed to improvements in end-gates, or tailboards, for wagons, trucks, and other vehicles, and has for its object the construction of a device of such a character that the same can be quickly and easily locked or engaged to a wagon or other vehicle, and as easily and quickly detached or disengaged therefrom.

A further object of the invention is to dispense entirely with the use of a rod or chain to hold the end-gate or side-boards in their proper positions, and to eliminate the usual jostling and moving about of the boards and the noise incident thereto.

The side-braces and straps which form a part of the combination not only prevent rattling and jostling of the parts, but in addition thereto materially reduce the strain on the sideboards, and in so doing increase their strength.

An added feature of this device is its simplicity, as there is practically nothing to get out of order, and the bracket covers all moving parts, thus shielding them from the elements and preventing an accumulation of dust and mud on them which would interfere with their usefulness and reduce their longevity.

As an alternative method of locking, a modification may be used in connection with the above. By including this alternative in the combination, I add a brace to support and hold the side-brackets in their proper positions; also a device for holding the lock members in a receding position when the end-gate is disengaged from the side-boards.

With these and other objects in view, this invention resides in the novel features of construction, formation, combination, and arrangement of parts to be hereinafter more fully described, illustrated and claimed in the accompanying drawings, in which:

Fig. 1 is a rear elevation of the device, as it appears when in position on a vehicle body. Fig. 2 is a plan view, showing arrangement of mechanism; Fig. 3 an enlarged sectional view of all moving parts, with their casing partly broken away. Fig. 4, alternative locking arrangement; Fig. 5, sectional view on lines 5—5 of Fig. 4.

Referring to the drawings more specifically, with reference to their numerals: 1 is the sideboard of vehicle. 2 refers to sidebrackets, containing mechanism and connected to cleats 4 with bolts or rivets 9. 3 refers to sidebraces connected to boards 13 and 11 by bolts or rivets 9. 5 refers to sidestraps, connected with parts 2 and 3 by means of rivets 23. 6 refers to lock members, actuated by spring members 7 mounted thereon. 10 refers to keys which hold part 7 under tension when device is disconnected from wagon body. 8 refers to knobs to hold handle 6 in receding position.

With reference to modifications shown in Figs. 4 and 5: Numerals 15 refer to connecting links between lockmembers 6 and handle 18. 16 refers to rivets or other connections to fasten brace 2ª to board 12. 17 is connecting pin between 6 and 15. 19 refers to bearings for lockmembers 6 through sidebrackets 2. 20 refers to bolts fastening one end of bracket 2 to board 12. 18 refers to handle of locking device. 2ª is brace from 2 to 2. 21, bearing pin for connecting link 15. 22, bearing pin for handle 18. 23 refers to rivets fastening sidestraps 5 to sidebrackets 2 and sidebraces 3.

The device operates as follows: The endgate is placed inside of wagonbox and moved forward until sidebraces 3 and sidebrackets 2 are flush against back ends of sideboards 1, sidestraps 5 being snug against outside of sideboards 1. The locking handle 18 of locking device is then released by a slight turn in a counter clock-wise direction, causing the springs 7 to pull lockmembers 6 outward until they pass through a hole prepared for them in sideboards 1.

It is obvious that this type of end-gate can be used in any kind of wagon body, as for instance, a wagon body designed to accommodate the ordinary and usual type of sliding end-gates. It is not necessary to make any alterations in wagon body to accommodate my end-gate. The end-gate shown in my Fig. 1 is for use on a hograck, but it is obvious that it can be used with equal advantage on any other type.

From the foregoing specification and explanation it is obvious that the structure disclosed is capable of many permutations and combinations without departing from the scope of the appended claim.

What is claimed is:

In the combination of a wagonbox having sideboards and an end-gate therefor, means carried on each side of end-gate adapted to engage the ends and sides of the sideboards, retaining means carried by the end-gate and adapted to be projected into engagement with the ends of said sideboards, means carried by the end-gate adapted to hold the said retaining means in retracted position, thereby permitting the end-gate to be removed in a horizontal direction.

In testimony whereof I affix my signature, in the presence of two witnesses.

FRANK X. SCHERRMAN.

Witnesses:
J. L. MAHONEY,
LEO M. SANNER.